United States Patent [19]  [11] Patent Number: 4,742,455
Schreyer  [45] Date of Patent: May 3, 1988

[54] CONTROL SYSTEM FOR COOKING APPARATUS

[75] Inventor: William M. Schreyer, Monroe, Conn.

[73] Assignee: Food Automation-Service Techniques, Inc., Stratford, Conn.

[21] Appl. No.: 840,362

[22] Filed: Mar. 17, 1986

[51] Int. Cl.$^4$ ............................................. G06F 7/00
[52] U.S. Cl. .................................. 364/400; 364/557; 99/325; 99/403; 99/DIG. 10
[58] Field of Search ................. 364/400, 557; 99/325, 99/403, DIG. 10

[56] References Cited

U.S. PATENT DOCUMENTS

| | | | |
|---|---|---|---|
| 4,301,509 | 11/1981 | Haase | 364/400 |
| 4,390,905 | 6/1983 | Albert | 364/400 |
| 4,437,159 | 3/1984 | Waugh | 364/400 |
| 4,580,025 | 4/1986 | Carlson | 364/557 |
| 4,601,004 | 7/1986 | Holt | 364/557 |
| 4,636,949 | 6/1987 | Longbaugh | 364/184 |
| 4,649,810 | 3/1987 | Wong | 364/400 |

Primary Examiner—Charles E. Atkinson
Assistant Examiner—Gail O. Hayes
Attorney, Agent, or Firm—Felfe & Lynch

[57] ABSTRACT

A control system for cooking apparatus and which includes a programmed digital microcomputer responsive to a plurality of user selectable product keys individually capable of setting the cooking temperature at individually selected values and the cooking times at individually selected values.

6 Claims, 3 Drawing Sheets

CONTROL SYSTEM FOR COOKING APPARATUS

This invention relates to control systems for cooking apparatus and, more particularly, to such control systems of the type controlled by a programmed digital microcomputer and suitable for use as a control system for commercial cooking apparatus.

U.S. Pat. No. 4,437,159-Waugh relates to a cooking computer for use with a deep fat fryer and having a temperature sensing probe. Up to 12 recipes, each of which includes a cooking time and a time-temperature adjustment factor for adjusting cooking time as a function of temperature during a cook cycle, can be stored in a microcomputer. Cooking times and time compensation factors stored in recipes are user alterable through a keyboard. Such a cooking computer is not capable of automatically shifting a temperature control setpoint when selecting a product and starting a cook cycle.

It is an object of the present invention to provide a new and improved control system for cooking apparatus which avoids one or more of the disadvantages of prior such control systems.

It is another object of the invention to provide a new and improved control system for cooking apparatus in which a user selectable product key is capable of setting the cooking temperature if the cooking temperature has not been set at the selected value elsewhere in the apparatus.

It is another object of the invention to provide a new and improved control system for cooking apparatus which is capable of automatically shifting the temperature of the cooking apparatus if the temperature set elsewhere in the apparatus has not been set at a newly selected value corresponding to a newly selected product.

It is another object of the invention to provide a new and improved control system for cooking apparatus which is capable of setting a parameter if the parameter has been set elsewhere at other than a newly selected value.

In accordance with the invention, a control system for cooking apparatus comprises means for optionally selecting a program subroutine for an optionally selected product for programming a microcomputer to control a cooking process. The control system also includes means responsive to the optionally selected subroutine for setting a parameter other than cooking time at a selected value in accordance with the optionally selected subroutine. The control system also includes means responsive to the optionally selected subroutine for storing timing information relating to the cooking process. The control system also includes means responsive to the storing means for determining whether the cooking process is complete.

Also in accordance with the invention, a control system for cooking apparatus comprises means for optionally selecting a program subroutine for an optionally selected product for programming a microcomputer to control a cooking process. The system also includes means responsive to the optionally selected subroutine for attempting to set a parameter of the apparatus at a selected value in accordance with the optionally selected subroutine. The apparatus also includes means coupled to the attempting means for determining whether the parameter has been set at the selected value elsewhere in the apparatus, and first register means coupled to the determining means for setting the parameter at the selected value. The apparatus also includes means for proceeding with the balance of the optionally selected subroutine, and second register means responsive to the optionally selected subroutine for storing timing information relating to the cooking process. The apparatus also includes means responsive to the second register means for decrementing the second register means as the cooking process continues, and means responsive to the second register means for determining whether the cooking process is complete.

Also in accordance with the invention, a control system for cooking apparatus comprises means for optionally selecting a program subroutine for an optionally selected product for programming a microcomputer to control a cooking process. The system also includes means responsive to the optionally selected subroutine for attempting to set a parameter of the apparatus at a selected value in accordance with the optionally selected subroutine. The control system also includes first means coupled to the attempting means for determining whether the parameter has been set at the selected value elsewhere in the apparatus, and second means for determining whether the parameter set at the selected value elsewhere is operating within a predetermined operating range of the selected value of the parameter as attempted to be set. The system also includes means responsive to the second determining means for continuing with the balance of the subroutine and register means responsive to the subroutine for storing timing information relating to the cooking process. The system also includes means responsive to the register means for decrementing the register means as the cooking process continues, and means responsive to the register means for determining whether the cooking process is complete.

Referring now to the drawings.

Figure 2:
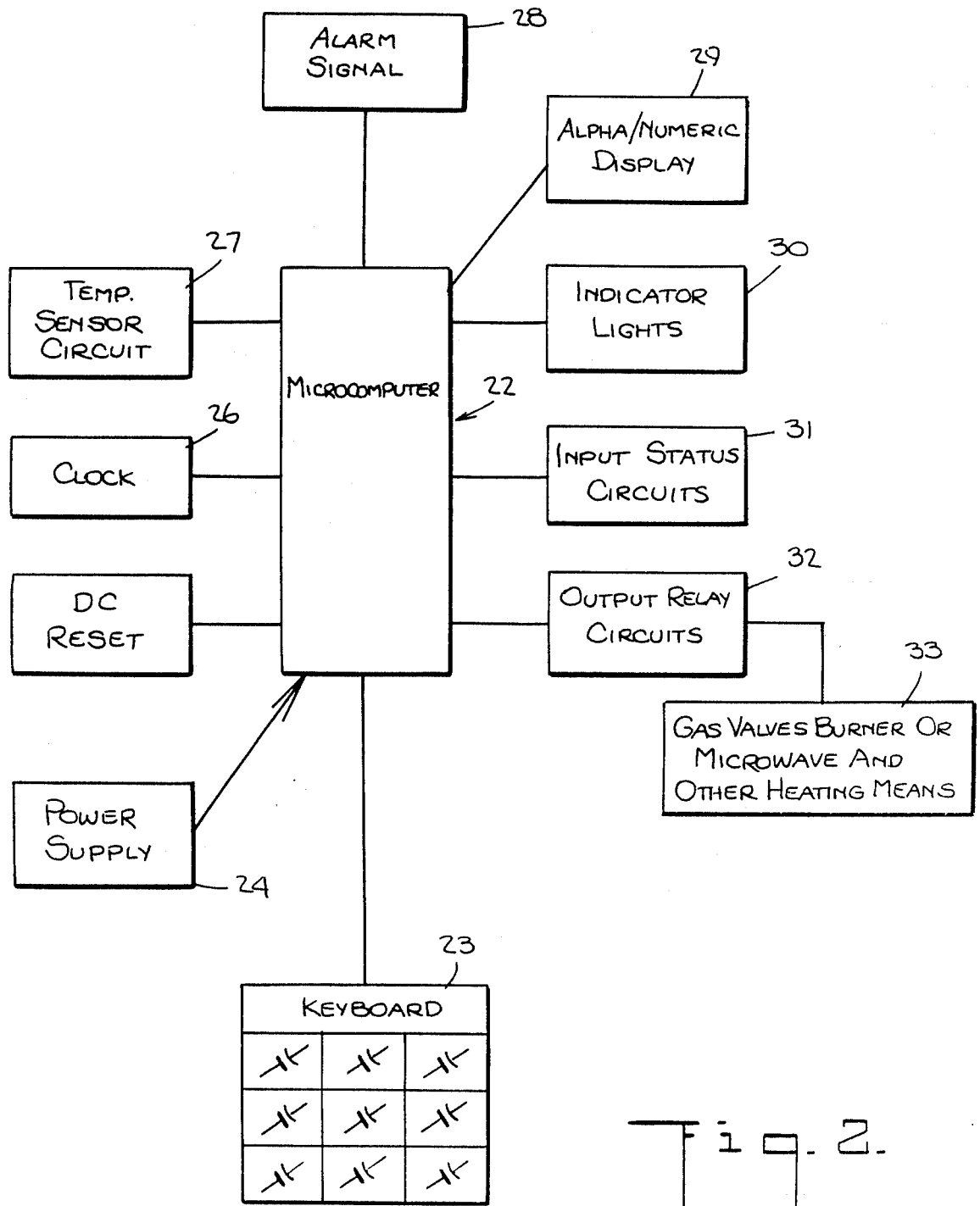
FIG. 2 represents apparatus including a microcomputer and usable in connection with a control system constructed in accordance with the invention.
Figure 3:
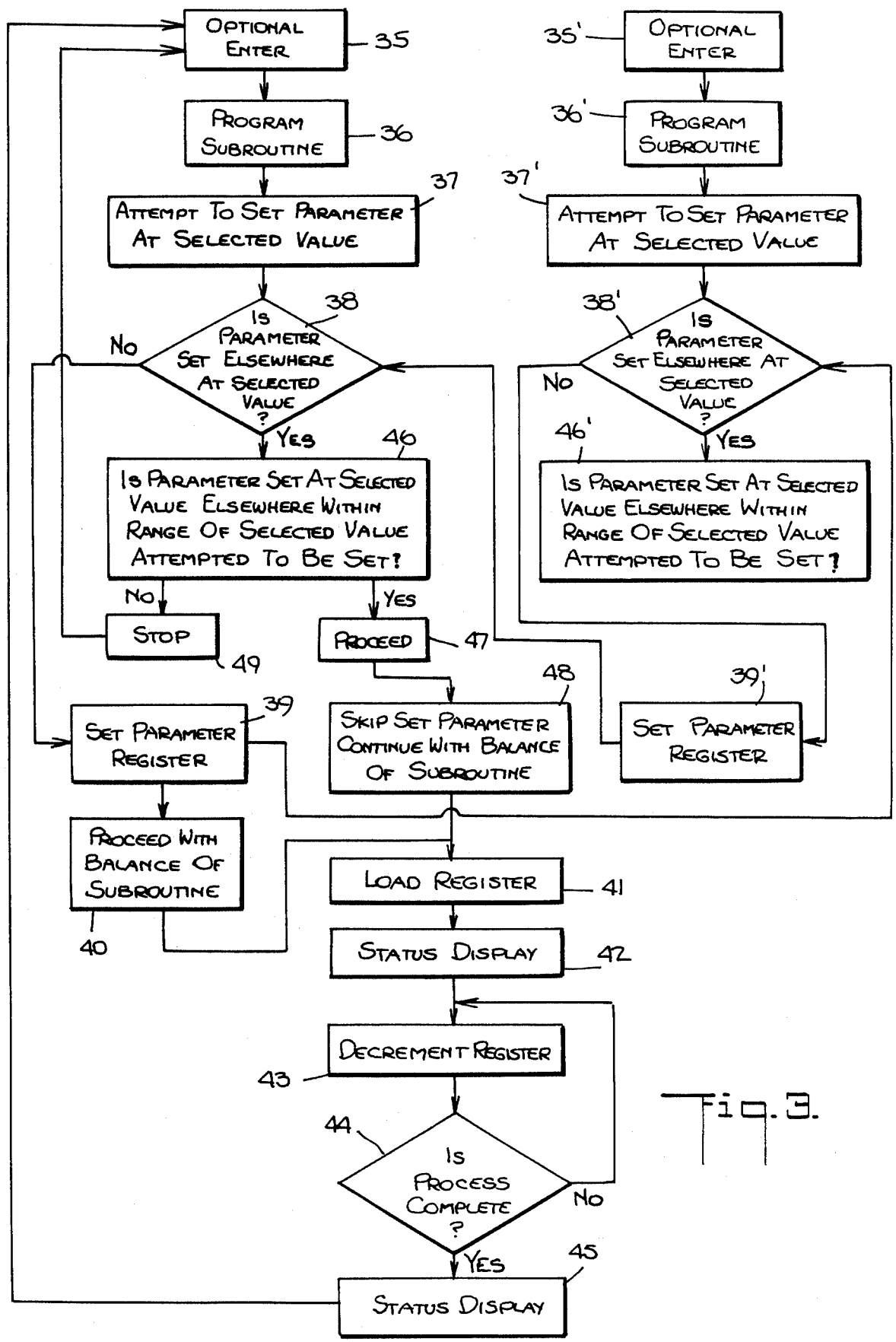
FIG. 3 is a flow chart comprising a representation of a portion of a microcomputer which operates according to a computer program produced according to the flow chart.

Before referring to the drawings in detail, it will be understood that for purposes of clarity, the apparatus represented in block diagrams in FIGS. 2 and 3 utilizes, for example, an analog-to-digital converter and a microprocessor which includes such hardware as a central processing unit, program and random access memories, timing and control circuitry, input-output interface devices and other conventional digital subsystems necessary to the operation of the central processing unit as is well understood by those skilled in the art. The microprocessor operates according to the computer program produced according to the flow chart represented in the drawings.

Figure 1:
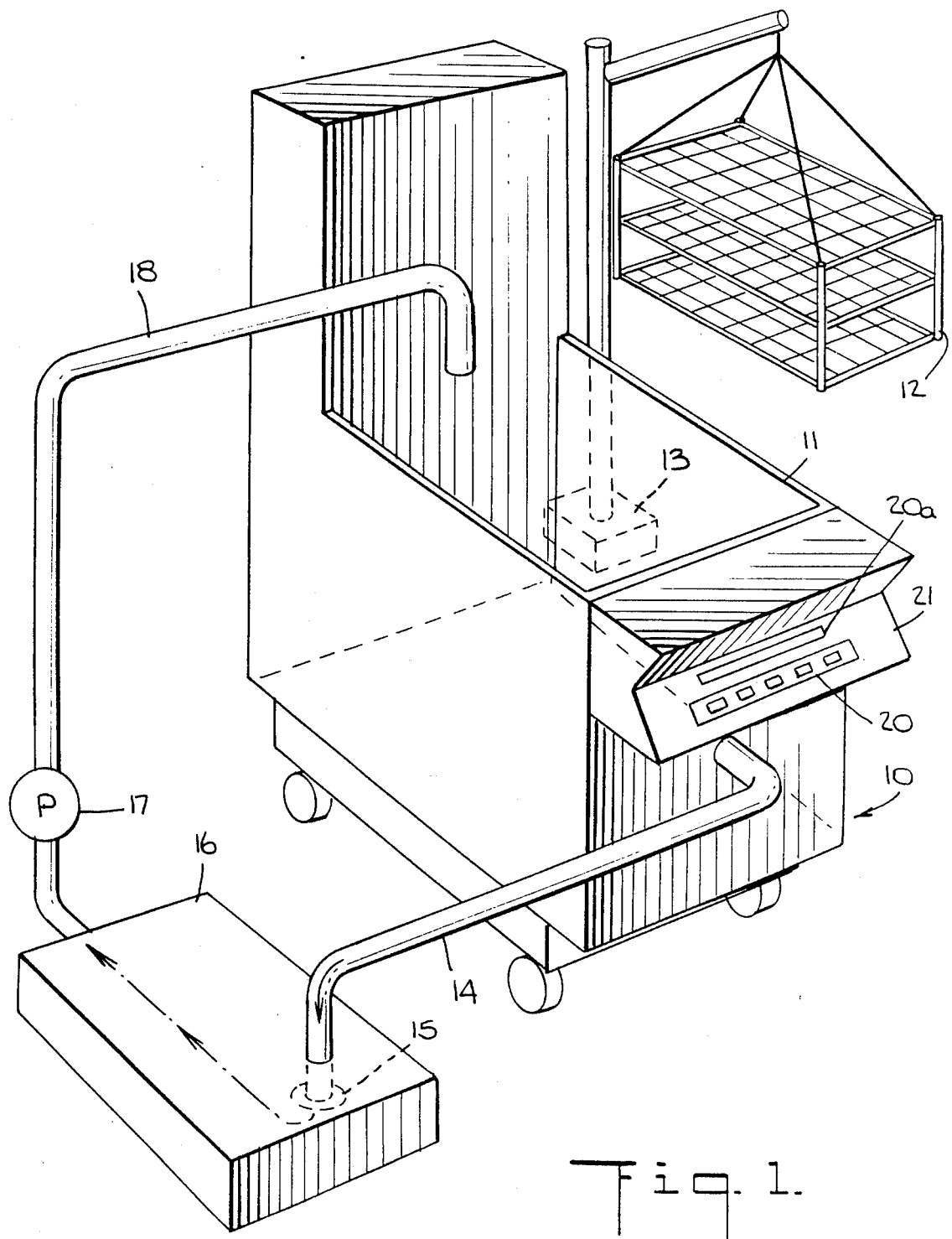
FIG. 1 is a perspective view of a fryer including a control system constructed in accordance with the invention.

Referring now more particularly to FIG. 1 of the drawings, there is represented cooking apparatus 10 comprising, for example, a fryer 11 having a movable product basket 12 operated by a gear and motor train 13 for movement into and out of the cooking medium such as shortening in the fryer 11.

The frying apparatus 11 has an oil drain pipe 14 connected to a drain valve 15 in a filter unit 16. The filter unit preferably comprises papers and chemicals for filtering the cooking oil. A pump 17 is provided for returning the oil to the cooking apparatus via a pipe 18. A control panel 20 having a display screen 20a in a header assembly 21 is connected to a control including a microcomputer in the header assembly for operating the control.

Referring now more particularly to FIG. 2 of the drawings, the microcomputer 22 includes a central processing unit which receives an input from the keyboard 23 which may, for example, comprise a capacitive keyboard.

The control includes a conventional power supply 24, a reset circuit 25 for resetting the microcomputer when renewing power in the power supply, a clock oscillator 26 for providing clock pulses to the microcomputer 22, a temperature sensor circuit 27 for sensing the temperature within the cooking apparatus, an audible alarm 28, an alpha/numeric display 29 and indicator lights 30. The apparatus also includes an input status circuit 31 which may, for example, be responsive to a door switch and to the open/close condition of the drain valve. The microcomputer controls an output relay circuit 32 which may, for example, control the gas valves of a burner or a heating element or microwave or other heating means.

Considering now the programmed microcomputer with reference to the flow chart of FIG. 3, the control system for cooking apparatus includes means 35 for optionally selecting a program subroutine 36 for programming the microcomputer to control a cooking process utilizing a cooking medium, for example, shortening or cooking oil. The selecting means 35 preferably comprises an "optional enter" portion 35 which may, for example, be a product cycle key, such as, a chicken cycle key. The control system also includes means 37 for attempting to set a parameter other than cooking time at a selected value in accordance with the optionally selected subroutine. The parameter may, for example, be the temperature of the cooking medium sensed by a temperature sensing probe of the temperature sensor circuit 27, or the parameter may, for example, be level, pressure or humidity.

The control system also includes means 38 coupled to the attempting means for determining whether the parameter has been set at a selected value elsewhere in the apparatus. The means 38 comprises a "is parameter set elsewhere at selected value?" microprocessor portion. The control system also includes first register means 39 coupled to the determining means 38 for setting the parameter at the selected value. More particularly, the first register means comprises a "set parameter register" microprocessor portion coupled to the "no" output of the means 38.

The control system also includes means 40 for proceeding with the balance of the optionally selected subroutine. The means 40 comprises a "proceed with balance of subroutine" microprocessor portion coupled to the output of the "set parameter" register microprocessor portion 39.

The control system also includes second register means 41 responsive to the optionally selected subroutine for storing timing information relating to the cooking process, for example, the total cooking time for a product. The second register means 41 comprises a "load register" microprocessor portion coupled to the microprocessor portion 40. When the "load register" microprocessor portion 40 is loaded, the cooking process for the selected product begins. The "load register" microprocessor portion 40 output is coupled to a status display 42 which may, for example, provide audio and visual outputs. For example, the display may indicate an operator prompt or alarm message.

The control system also includes means 43 responsive to the second register means 41 for decrementing the register means 41 as the cooking process continues. The means 43 comprise a "decrement register" microprocessor portion 43. The control system also includes means 44 responsive to the register means 41 for determining whether the cooking process is complete. The means 44 comprises a "is process complete?" microprocessor portion. The "no" output of the microprocessor portion 44 is coupled to the "decrement register" microprocessor portion 43 to continue the decrementing of the register microprocessor portion 41 until the cooking process is complete. The microprocessor portion 44 has a "yes" output coupled to a status display 45 which may, for example, display the word "done" indicating that the cooking process is complete. The display may also, for example, take the form of an audio signal.

The decrementing of the register microprocessor portion 41 by the "decrement register" microprocessor portion 43 may be done by, for example, a timer or a complex cooking computer program function.

The status display microprocessor portion 45 is coupled to the "optional enter" microprocessor portion 35 to terminate the program subroutine cooking process.

The control system also includes second means 46 for determining whether the parameter set at the selected value elsewhere is operating within a predetermined operating range of the selected value of the parameter as attempted to be set by the microprocessor portion 37. The second means 46 comprises a "is parameter set at the selected value elsewhere operating within a predetermined operating range of the selected value of the parameter as attempted to be set?" coupled to the "yes" output of the microprocessor portion 38. A "proceed" microprocessor portion 47 is coupled to the "yes" output of the microprocessor portion 46. The apparatus also includes means 47, 48 responsive to the second determining means 46 for continuing with the balance of the subroutine. The "proceed" microprocessor portion 47 is coupled to a "skip set parameter, continue with balance of subroutine" microprocessor portion 48. The microprocessor portion 48 is coupled to the "load register" microprocessor portion 41.

The "no" output of the "is parameter set at selected value elsewhere within range of selected value attempted to be set?" microprocessor portion 46 is coupled to a "stop" microprocessor portion 49. The "stop" microprocessor portion 49 is coupled to the "optional enter" microprocessor portion 35 to terminate the program subroutine.

The control system also includes a plurality of additional portions similar to those just described from the "optional enter" key 35 through the "stop" microprocessor portion 49. A portion of another channel similar to that just described is represented in FIG. 3 with similar portions having similar reference numerals primed to represent the coupling between the "set parameter" register 39' microprocessor portion and the "is parameter set at selected value?" microprocessor portion 38.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A control system for cooking apparatus comprising means for simultaneously running a plurality of cooking subroutines to cook different products associated with each subroutine, said means including:

a plurality of means for optionally selecting a desired program subroutine such that a plurality of program subroutines for a plurality of optionally selected products can run simultaneously;

means responsive to one of said one of optionally selected subroutines for attempting to set a parameter of the apparatus at a selected value in accordance with said optionally selected subroutine;

means coupled to said attempting means for determining whether said parameter has been set at said selected value by a previously optionally selected subroutine in the apparatus;

first register means coupled to said determining means for setting said parameter at said selected value;

means for interrupting said one desired program subroutine if the parameter has been set by another previously optionally selected and currently running subroutine and is not within a predetermined operating range of said selected value of the parameter as attempted to be set;

means for proceeding with the balance of said desired optionally selected subroutine;

second register means responsive to said desired optionally selected subroutine for storing timing information relating to the cooking process;

means responsive to said second register means for decrementing said second register means as the cooking process continues; and means responsive to said second register means for determining whether the cooking process is complete.

2. A control system in accordance with claim 1, in which said plurality of means for optionally selecting a desired program subroutine comprises a plurality of means for individually optionally selecting individual desired program subroutines for individual optionally selected products, and which control system includes a plurality of means individually responsive to said individual optionally selected subroutines for attempting to set a parameter of the apparatus at a selected value in accordance with said individual optionally selected subroutines, and a plurality of means individually coupled to said attempting means for determining whether said parameter has been set at said selected value by a previously optionally selected subroutine in the apparatus.

3. A control system in accordance with claim 1, in which said apparatus includes a cooking medium and said parameter is the temperature of said cooking medium.

4. A control system in accordance with claim 3, which includes means for displaying the temperature of said medium.

5. Apparatus in accordance with claim 1 which includes means for displaying the status of said parameter.

6. A control system for cooking apparatus comprising means for simultaneously running a plurality of cookin subroutines to cook different products associated with each subroutine, said means including:

a plurality of means for optionally selecting a desired program subroutine such that a plurality of program subroutines for a plurality of optionally selected products can run simultaneously;

means responsive to one of the optionally selected subroutines for attempting to set a parameter of the apparatus at a selected value in accordance with said optionally selected subroutine;

first means coupled to said attempting means for determining whether the parameter has been set at said selected value by a previously optionally selected subroutine in the apparatus;

second means for determining whether the parameter set at said selected value by a previously optionally selected subroutine is operating within a predetermined operating range of said selected value of the parameter as attempted to be set;

means for interrupting said one desired program subroutine if the parameter has been set by another previously optionally selected and currently running subroutine and is not within said predetermined operating range of said selected value of the parameter as attempted to be set;

means responsive to said second determining means for continuing with the balance of said desired optionally selected subroutine;

register means responsive to said desired optionally selected subroutine for storing timing information relating to the cooking process;

means responsive to said register means for decrementing said register means as the cooking process continues; and means responsive to said register means for determining whether the cooking process is complete.

* * * * *

UNITED STATES PATENT AND TRADEMARK OFFICE
CERTIFICATE OF CORRECTION

PATENT NO. : 4,742,455

DATED : May 3, 1988

INVENTOR(S) : William M. Schreyer

It is certified that error appears in the above-identified patent and that said Letters Patent is hereby corrected as shown below:

Column 5, line 13 for "said one of optionally"

read -- said optionally --.

Signed and Sealed this

Seventeenth Day of January, 1989

Attest:

DONALD J. QUIGG

*Attesting Officer*   *Commissioner of Patents and Trademarks*